United States Patent

Bury

Patent Number: 5,667,340
Date of Patent: Sep. 16, 1997

[54] CEMENTITIOUS COMPOSITION FOR UNDERWATER USE AND A METHOD FOR PLACING THE COMPOSITION UNDERWATER

[75] Inventor: Jeffrey Bury, Macedonia, Ohio

[73] Assignee: Sandoz Ltd., Basel, Switzerland

[21] Appl. No.: 523,203

[22] Filed: Sep. 5, 1995

[51] Int. Cl.$^6$ .......................... C04B 24/22; C04B 24/28; E02D 15/06

[52] U.S. Cl. .......................... 405/223; 106/726; 106/805; 106/823; 405/266

[58] Field of Search .......................... 166/293; 405/222, 405/223, 266; 106/726, 805, 823

[56] References Cited

U.S. PATENT DOCUMENTS

| | | | |
|---|---|---|---|
| 4,266,889 | 5/1981 | Rail et al. | 405/223 |
| 4,462,837 | 7/1984 | Baker et al. | 166/293 X |
| 4,466,837 | 8/1984 | Chatterji et al. | 106/726 |
| 4,707,188 | 11/1987 | Tsuda et al. | 166/293 X |
| 4,743,301 | 5/1988 | Ito et al. | 405/222 |
| 4,746,364 | 5/1988 | Kawai et al. | |
| 4,804,297 | 2/1989 | Reifsnyder et al. | 405/222 |
| 5,484,019 | 1/1996 | Griffith | 166/293 |
| 5,494,516 | 2/1996 | Drs et al. | 106/819 |

FOREIGN PATENT DOCUMENTS

| | | |
|---|---|---|
| 208535 | 1/1987 | European Pat. Off. |
| 0 364 149 | 4/1990 | European Pat. Off. |
| 43 24 334 | 1/1994 | Germany |
| 43 20 508 | 12/1994 | Germany |
| 52-090528 | 5/1978 | Japan |
| 62-036055 | 11/1987 | Japan |
| 02 161 015 | 3/1991 | Japan |
| 05 117 005 | 5/1993 | Japan |
| 05 093 182 | 8/1993 | Japan |
| WO9211982 | 7/1992 | WIPO |

*Primary Examiner*—George A. Suchfield
*Attorney, Agent, or Firm*—Renner, Kenner, Greive, Bobak, Taylor & Weber

[57] ABSTRACT

A method for placing concrete underwater comprising pumping a flowable cementitious mixture comprising cement, water and one of either BNS or a cellulosic polymer to the underwater point of discharge of the cementitious mixture from a delivery tube and adding into the flowable cementitious mixture at the point of discharge, the other of the BNS or a cellulosic polymer resulting in a cementitious mixture having zero flow characteristics.

9 Claims, 1 Drawing Sheet

CEMENTITIOUS COMPOSITION FOR UNDERWATER USE AND A METHOD FOR PLACING THE COMPOSITION UNDERWATER

BACKGROUND OF THE INVENTION

1. Field of the Invention

The present invention relates to underwater concrete and more particularly to a method of placing concrete underwater comprising pumping a fluid cementitious mixture wherein the rheology, flow characteristics and washout resistance of the cementitious mixture are readily controllable at the point of discharge.

2. Description of the Related Art

The placing of concrete underwater, whether for repair of existing structures or the building of new structures, often results in the washout of fines from the freshly mixed concrete and/or in segregation of the concrete mix. In order to prevent this, most concrete mixes used for underwater placement include an anti-washout admixture. Most of the anti-washout admixtures typically include a cellulose material to increase the water retentivity and thixotropy of the mixture so that the mixture is fluid enough to be transported under water, e.g. by pumping, but sufficiently cohesive to minimize segregation and washout. For many underwater applications, one or another of the cellulose based anti-washout admixtures is sufficient. However, in situations where large amounts of concrete need to be placed in areas where there is severe water flow and/or water pressure, such as repair of dams and back filling the annular void behind tunnel linings, the cellulose based anti-washout admixtures can be insufficient in preventing washout and segregation.

Thus, there is a need for a method of placing concrete underwater wherein the fresh cementitious mixture is fluid enough to be pumped yet sufficiently cohesive once it reaches water to prevent segregation and washout even under conditions of severe water flow and/or water pressure.

SUMMARY OF THE INVENTION

In accordance with the present invention, there has been found a method for placing concrete underwater comprising the steps of pumping through a delivery tube a flowing cementitious composition comprising cement and one of either a cellulosic polymer or a β-naphthalene sulfonate formaldehyde condensate (BNS) to the underwater point of discharge of the cementitious composition from the delivery tube, introducing into the cementitious composition in the delivery tube at the point of discharge the other of said cellulosic polymer or BNS, agitating the cementitious composition and, discharging the cementitious composition from the delivery tube, said cellulosic polymer and BNS being used in a weight ratio of 1:0.5 to 1:10, respectively, provided however, that the combination of the cellulosic polymer and the BNS results in a gelling of the cementitious composition.

The agitation may be accomplished by any means such as an in-line static mixing tube.

The method of the present invention allows placing of concrete underwater by a pumping method which permits ready control of the rheology, flow characteristics and washout resistance of a cementitious composition during underwater placement conditions. The rheology control can be advantageously employed at the point of discharge of the cementitious mix from the delivery tube into the water where a highly flowable mixture can be reduced to one having zero flow. This allows for the use of conventional mixing, handling and pumping techniques to place the cementitious mixes underwater while gaining the significant anti-washout performance associated with a mixture having zero flow.

In a further embodiment, the present invention is directed to a cementitious composition comprising cement to which has been added a cellulosic polymer and a β-naphthalene sulfonate formaldehyde resin in a weight ratio of cellulosic polymer and β-naphthalene sulfonate formaldehyde resin of 1:0.5 to 1:10.

DETAILED DESCRIPTION OF THE INVENTION

Figure 1:
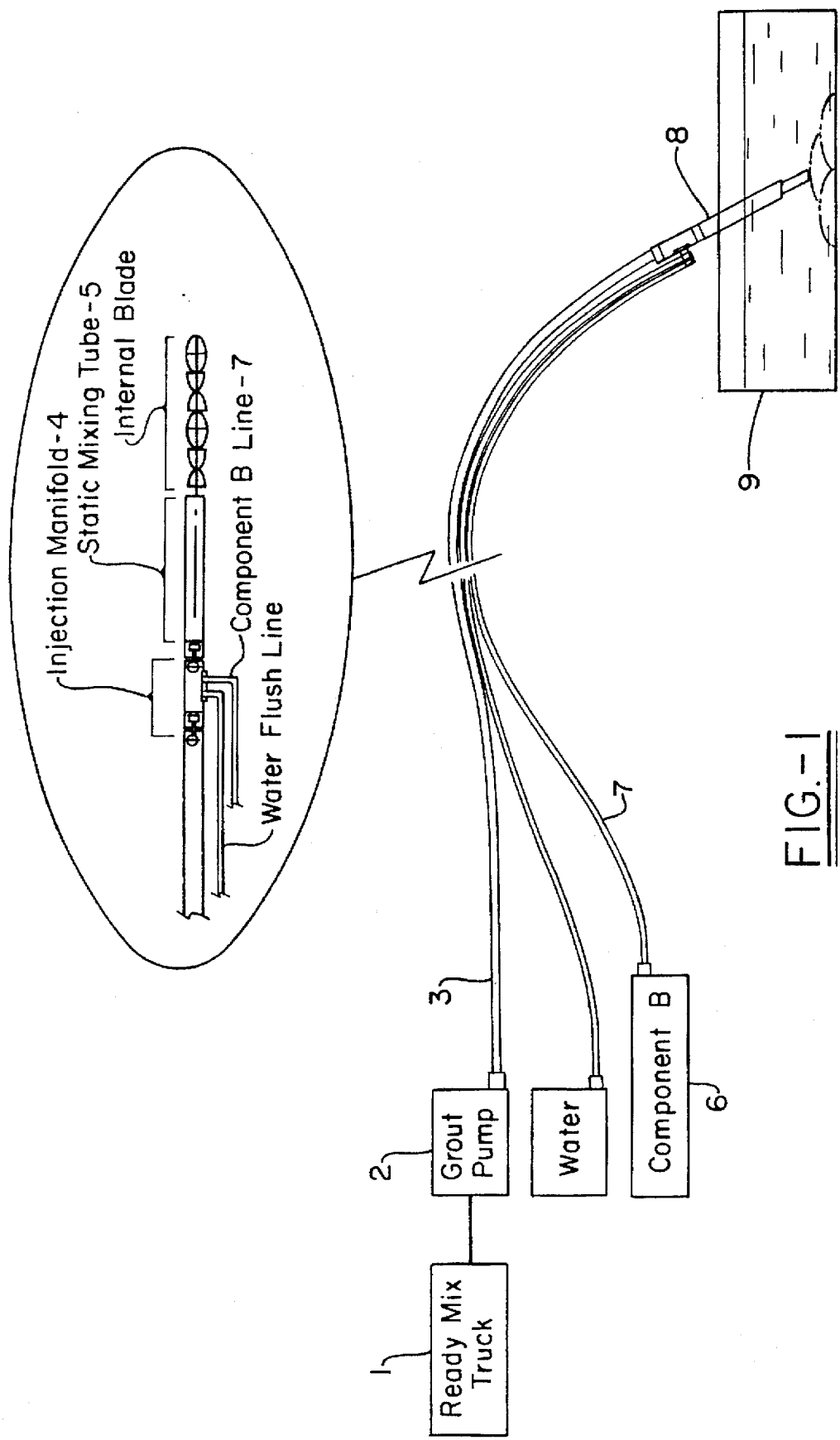
FIG. 1 is a schematic diagram of a grouting system used to place concrete underwater according to the present invention.

The method of the present invention is directed at placing concrete underwater. For purposes of the present invention the term "concrete" is intended to mean a composition which comprises cement, water and aggregate and includes mortars and grouts.

The cellulosic polymers useful in the present invention can be any cellulose derivatives known in the art to be useful as an anti-washout material provided the cellulose derivative reacts with BNS when both are present in a cementitious mixture to cause a gelling reaction as described herein. Suitable materials include cellulose ethers such as alkylcelluloses and hydroxyalkylcelluloses. Specific cellulose polymers which can be used include hydroxypropylmethylcellulose, hydroxyethylcellulose, methylcellulose, hydroxyethylmethylcellulose, hydroxyethylhydroxypropylcellulose, ethylhydroxyethylcellulose, carboxymethylcellulose, carboxymethylhydroxyethylcellulose and carboxymethylhydroxyethylcellulose.

The cellulosic polymers can be used in any physical form, e.g. a liquid or a solid, however, if the cellulosic polymer is to be introduced into the cementitious mixture at the point of discharge from the delivery tube, it is preferred that the cellulosic polymer be in liquid form for ease of dispensing and complete incorporation into the cementitious mixture. The liquid form can include aqueous solutions as well as emulsions of the cellulosic polymers. A particularly preferred cellulosic polymer is Rheomac® UW 450, a liquid anti-washout admixture comprising a hydroxyethylcellulose, available from Master Builders, Inc., Cleveland, Ohio.

The cellulosic polymer is generally used in an amount of 0.025% to 0.50%, preferably 0.04% to 0.40%, actives by weight based on the weight of cement.

The β-naphthalene sulfonate formaldehyde condensates (BNS) useful in this invention are readily-available materials, widely used as superplasticizers in the concrete industry. The BNS materials are generally used in their calcium or sodium salt forms. A suitable material is Rheobuild® 1000, available from Master Builders, Inc., Cleveland, Ohio.

The BNS can be used in any physical form, e.g. a solid, powder or liquid including aqueous solutions and emulsions of the BNS. However, if the BNS is introduced into the cementitious mixture at the point of discharge from the delivery tube, it is preferred that it be used as an aqueous solution for ease of dispensing and complete incorporation into the cementitious mixture.

The BNS is generally added to the cementitious mix in an amount of 0.10% to 1.0%, preferably 0.125% to 0.75%, actives by weight based on the weight of cement.

It is not critical which of the BNS or cellulosic polymer is added to the cementitious mixture prior to being pumped, as long as only one of the two materials is added to the cementitious mix on batching and the other at the point of discharge of the cementitious mix from the delivery tube after being pumped underwater. Or, if both BNS and cellulosic polymer are added on batching, the ratio of the two must be such that the gelling reaction does not occur. The later addition of one or the other or both of BNS or cellulose polymer must be what initiates the gelling reaction.

To be useful in the present invention, the cellulosic polymer and BNS must be present at the point of discharge in a weight ratio of actives of 1:0.5 to 1:10 with each other, preferably 1:0.75 to 1:8, more preferably 1:1.5 to 1:4 and most preferably 1:2 to 1:3. That is, the total amount of BNS and cellulose polymer added to the cementitious mixture, whether upon initial batching, at the point of discharge or at some other point during mixing or transport, must fall within the above specified weight ratio. If the weight ratio of cellulosic polymer to BNS falls outside this range at the point of discharge, there is generally no noticeable reduction in slump or flow. Depending on the particular cellulosic polymer and the BNS employed, the ratio may vary within the stated range.

The method of control of the rheology, flow characteristics and washout resistance of the present invention is based on the reaction between the cellulosic polymer and the β-naphthalene sulfonate formaldehyde condensate (BNS). When the two materials are used in conjunction with each other in the amounts and manner taught by the present invention, they react in the cementitious mixture causing it to gel and consequently kill the slump (flow) of the cementitious mixture. Because the interaction of the cellulosic polymer and the BNS causes a gelling rather than a true "hard" set, the cementitious mix retains plastic-like characteristics which allows for workability, which is often desirable, but is sufficiently cohesive to be highly resistant to segregation and washout.

The rate of the gelling reaction can be controlled by altering the ratio of cellulosic polymer to BNS within the range described herein and/or by adjusting the quantities of cellulosic polymer and BNS in the cementitious mixture for a given water to cement (W/C) ratio. The lower the W/C ratio, the quicker the gelling reaction for a given quantity of cellulosic polymer and BNS. At a constant W/C ratio, the gelling reaction is quicker as the quantity of BNS is increased relative to the cellulosic polymer given that the level of cellulosic polymer is at least 0.15% actives by weight of cement. At a given W/C ratio and a given ratio of cellulosic polymer to BNS, the lower the quantities of cellulosic polymer and BNS present, the slower the gelling reaction.

The cementitious mixtures of the present invention, upon initial batching, generally comprise cement, water, aggregate, and one of either a cellulosic polymer or BNS. It is essential that the cementitious mixture be flowable so that it can be easily pumped underwater.

The water to cement ratio of the cement mix is generally in the range of 0.30 to 0.90, preferably 0.30 to 0.60.

The cement used in the present invention can be any type normally used for underwater concreting and the choice will depend upon the particular application and availability of materials.

The type and amount of aggregate useful in the present invention is that normally used in underwater concreting and will vary depending upon the particular application and availability of materials.

Any of the concrete admixtures or additives commonly used in underwater concreting can be added to the cementitious mixes of the present invention provided they do not interfere with the gelling reaction of the cellulosic polymer and the BNS at the point of discharge of the cementitious mixture. Examples of admixtures or additives which can be used include but are not limited to water reducers, slag and fly ash. Accelerators may also be used, however, they are generally not preferred since, if added in upon batching they can interfere with the flowability of the cementitious mixture during pumping and, if mixed in at the point of discharge of the cementitious mix from the delivery tube with the other of said cellulosic polymer or BNS, can cause a hard mass to form which is often undesirable in underwater concreting applications.

Conventional mixing, handling and pumping techniques can be used to place the concrete underwater by the method of the present invention.

The present invention is applicable to any situation where pumping a flowable mixture is the desired placement technique but point of discharge conditions, such as flowing water or high water pressure, require the non-segregating, highly wash-out resistant characteristics of a zero flow mixture. It is particularly suited to situations where large amounts of concrete need to be placed underwater and there is severe water flow and/or severe water pressure, such as the grouting of water-filled cavities in geologic formations and filling the annular void behind tunnel linings.

The following examples are offered in order to further illustrate the present invention and are not intended to be limiting.

EXAMPLE 1

A neat cement grout was prepared in a small beaker by combining 250 g of Type I portland cement and 100 mL of tap water. 14 fl. oz. of a fluidized suspension of hydroxyethylcellulose polymer (HEC), available under the tradename Rheomac® UW 450, from Master Builders, Inc., Cleveland, Ohio, per 100 lbs of cement was added to the neat cement grout resulting in a pourable, fluid grout. To the fluid grout was added 14 fl. oz. of a solution of β-naphthalene sulfonate formaldehyde condensate (BNS), commercially available under the tradename Rheobuild® 1000, from Master Builders, Inc., per 100 lbs of cement. Upon addition of the BNS, a gelling reaction occurred within 10 seconds of stirring which caused the pourable grout mixture to convert to a semi-solid rubbery mass with zero flow properties, i.e. the mixture was workable but would not move on its own.

EXAMPLE 2

A neat cement grout was prepared as described in Example 1 except that the amount of HEC added was 4 fl. oz. per 100 lbs of cement and the amount BNS added 4 fl. oz. per 100 lbs of cement. The addition of the HEC resulted in a pourable, fluid grout, which upon the addition of the BNS gelled within 3 minutes of stirring to become a semi-solid rubbery mass with zero flow properties.

EXAMPLE 3

A neat cement grout was prepared as described in Example 1 except that the amount of HEC added was 14 fl. oz. per 100 lbs of cement and the amount BNS added was 4 fl. oz. per 100 lbs of cement. The addition of the HEC resulted in a pourable, fluid grout, which upon the addition of the BNS, gelled within 2 minutes of stirring reducing the fluid grout to zero flow.

EXAMPLE 4

A neat cement grout was prepared in a small beaker by combining 250 g of Type I portland cement and 175 mL of tap water. 20 fl. oz. of HEC (same material as used in Example 1) per 100 lbs of cement was added to the neat cement grout resulting in a pourable, fluid grout. To the fluid grout was added 20 fl. oz. of a BNS solution (same material as described in Example 1) per 100 lbs of cement. Upon addition of the BNS, a gelling reaction occurred within 3 minutes of stirring which caused the pourable, fluid grout mixture to convert to a mixture with zero flow properties.

EXAMPLE 5

As depicted in FIG. 1, a flowable grout mixture was prepared in a Ready Mix truck 1 by combining 1269 pounds of Type I portland cement, 676 pounds of water and 1418 pounds of concrete sand. 20.4 fl. oz. of HEC (the same material as that used in Example 1) per 100 lbs cement was added to the grout mixture resulting in a flowable grout. The grout mixture was then pumped 2 through approximately 50 feet of 2" diameter hose 3. At the discharge end of the hose was an injection manifold 4 and an in-line static mixing tube 5. A BNS solution (the same as that used in Example 1) 6 was introduced into the grout mixture through line 7 via the injection manifold 4 at a rate such that the flowing grout was converted to a gelled, semi-solid mass (as determined by visual analysis) that was extruded from the end of the hose 8. The washout resistance and grout integrity were evaluated by pumping the gelled grout into a large tank of water 9 and collecting a sample of the grout in a three gallon pail. Washout resistance was excellent as demonstrated by minimal clouding of the water as the grout was pumped. At approximately 15 minutes after pumping the grout into the large tank of water, samples collected above and below the water were semi-solid rubbery masses which were not diluted or affected by the intermixing of the water but remained cohesive demonstrating excellent grout integrity.

I claim:

1. A method of placing concrete underwater comprising the steps of pumping through a delivery tube a flowing cementitious composition comprising cement and one of either a cellulosic polymer or a β-naphthalene sulfonate formaldehyde condensate to the end of the tube at the point of discharge, introducing into the cementitious composition at the point of discharge the other of said cellulosic polymer or β-naphthalene sulfonate formaldehyde condensate, and, discharging the cementitious composition from the delivery tube at an underwater location, said cellulosic polymer and β-naphthalene sulfonate formaldehyde condensate being used in a weight ratio of 1:0.5 to 1:10, respectively.

2. A method according to claim 1 wherein the weight ratio of cellulosic polymer to β-naphthalene sulfonate formaldehyde condensate is 1:1.5 to 1:4.

3. A method according to claim 1 wherein the weight ratio of cellulosic polymer to β-naphthalene sulfonate formaldehyde condensate is 1:2 to 1:3.

4. A method according to claim 1 wherein the cellulosic polymer is present in an amount of 0.025% to 0.50% by weight based on the weight of the cement.

5. A method according to claim 1 wherein the β-naphthalene sulfonate formaldehyde condensate is present in an amount of 0.1% to 1.0% by weight based on the weight of the cement.

6. A method according to claim 1 wherein the cellulosic polymer is a hydroxyethyl cellulose.

7. A method according to claim 1 wherein said cementitious composition includes water.

8. A method according to claim 7 wherein said cementitious composition has a water to cement ratio of 0.30 to 0.90.

9. A method according to claim 8 wherein said cementitious composition additionally includes sand.

* * * * *